United States Patent [19]

Parquet

[11] Patent Number: 4,537,274
[45] Date of Patent: Aug. 27, 1985

[54] SEAT BELT ASSEMBLY
[75] Inventor: Donald J. Parquet, Burlington, Iowa
[73] Assignee: J. I. Case Company, Racine, Wis.
[21] Appl. No.: 660,824
[22] Filed: Oct. 15, 1984
[51] Int. Cl.³ .............................................. B60R 21/10
[52] U.S. Cl. ..................................... 180/270; 280/801
[58] Field of Search ........................ 180/268, 269, 270; 280/801, 802, 748

[56] References Cited
U.S. PATENT DOCUMENTS

| | | | |
|---|---|---|---|
| 2,705,529 | 4/1955 | Bull et al. | 180/268 X |
| 3,340,523 | 9/1967 | Whitman | 180/270 X |
| 3,343,622 | 9/1967 | Maurer | 180/270 |
| 3,712,401 | 1/1973 | Rothschild | 280/801 X |

Primary Examiner—Tony M. Argenbright
Attorney, Agent, or Firm—Cullen, Sloman, Cantor, Grauer, Scott & Rutherford

[57] ABSTRACT

A seat belt assembly which requires an operator to buckle the seat belt straps together in front of him when he is seated. The seat belt straps are inserted through flexible shields on opposed sides of an operator's chair with leaf springs extending from the ends of the shields to positions beneath and slightly inwardly of the chair arms. If the operator attempts to leave the straps unbuckled or to buckle the straps behind him, the leaf springs cause sufficient discomfort to prevent this nonuse or misuse of the seat belt assembly. Further, the straps may be provided with projections adjacent their secured ends which also cause discomfort to the operator if the straps are not buckled properly. The seat belt assembly also includes a switch which is secured to a mounting bracket on the floor of the operator's compartment. A support member is rotatably secured to the mounting bracket with a leaf spring actuator member being connected to the support member for actuating the switch when the support member is rotated in response to the buckling of the seat belt straps. If the ends of the seat belt straps are buckled properly, the support member is rotated thereby bringing the leaf spring actuator member into engagement with the switch for closing the switch.

6 Claims, 7 Drawing Figures

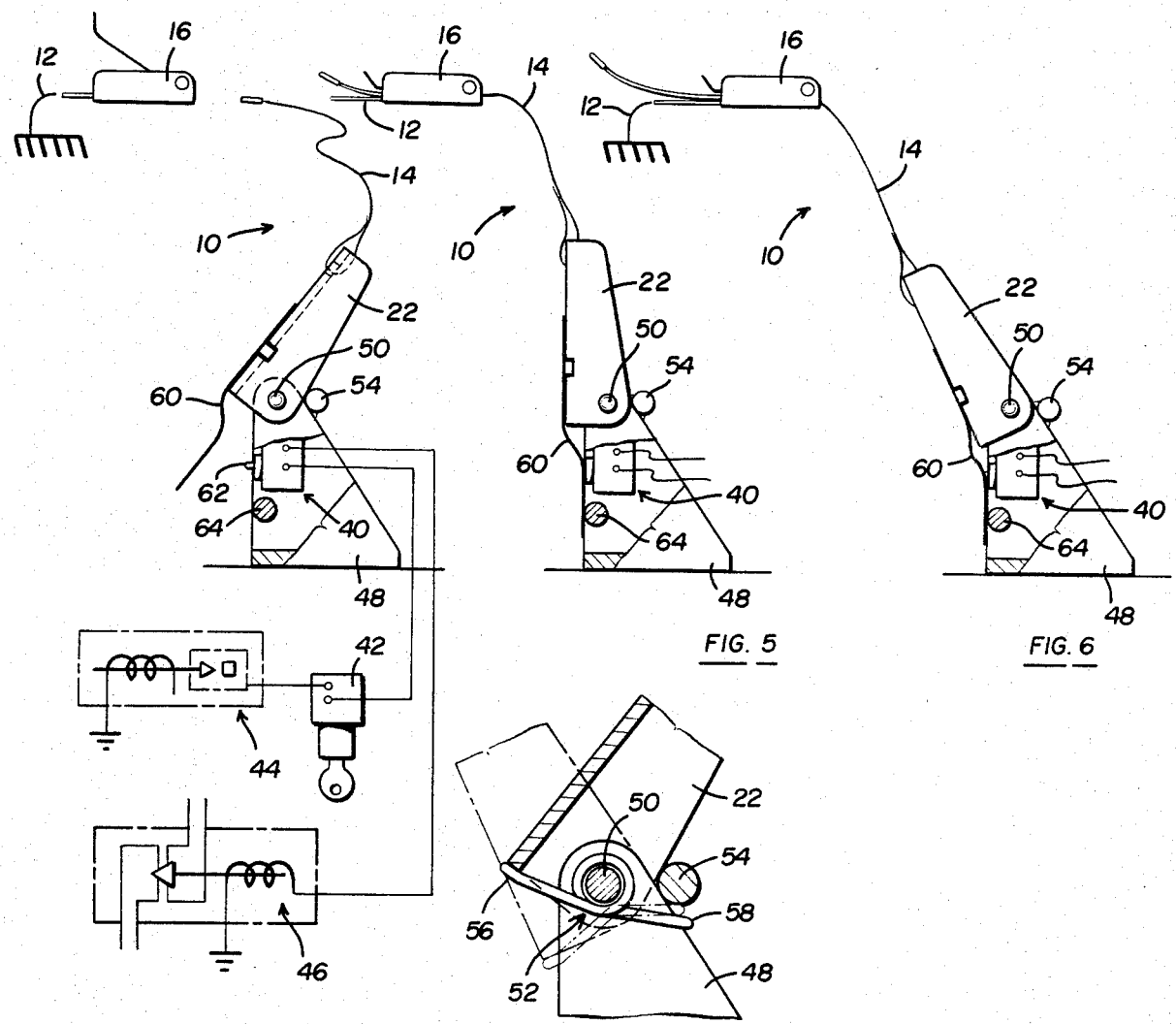

SEAT BELT ASSEMBLY

BACKGROUND OF THE INVENTION

The present invention relates to a seat belt assembly for front end loaders, and more particularly, to a seat belt assembly which requires an operator to buckle the seat belt straps together in front of him when he is seated in the operator's chair.

Front end loaders often include a cab portion having an operator's seat from which the loader is operated and from which the operator can control the various functions of the loader. It is conventional to provide devices such as seat belts and the like for securing an operator in his seat during machine operation. It is desirable that these devices be simple in construction and conveniently located such that the operator will use them when operating the machine.

Thus, the present invention is directed to an improved seat belt assembly for securing the operator in his seat during the operation of the machine while making it impractical for the operator to subvert the purpose of using the seat belt assembly.

SUMMARY OF THE INVENTION

One of the features of the seat belt assembly of the present invention is that it requires an individual to buckle the seat belt straps together in front of him when he is seated in the operator's chair thereby making it impractical to subvert the purpose of using the seat belt assembly. The seat belt assembly includes a pair of opposed straps with one end of a first strap having a buckle for receiving and securing one end of a second strap, as is conventional. The opposite end of the first strap is fixedly secured to a bracket on the operator's compartment floor and the opposite end of the second strap is connected to a rotatable support member. The assembly also includes a switch which is electrically connected in a circuit having conventional elements including a key start, starter relay, and solenoid operated hydraulic valve. The switch is secured to a mounting bracket on the compartment floor with the support member being rotatably attached to the mounting bracket for rotation about a generally horizontal axis. A torsion spring biases the support member towards a position in engagement with a transverse stop on the mounting bracket.

A leaf spring is connected to the rotatable support member for actuating the switch when the support member is rotated in response to the buckling of the seat belt straps. When the straps are unbuckled, the torsion spring biases the rotatable support member against the stop of the mounting bracket to prevent engagement between the leaf spring and switch. In this position, the switch is open whereby the starter relay and solenoid operated valve cannot be operated, and therefore, the engine and hydraulic cylinder connected to the relay and valve are also inoperable. When the operator assumes a seated position and buckles the ends of the straps together, the support member is automatically rotated thereby bringing the leaf spring into engagement with the switch for closing the switch thereby permitting operation of the engine and hydraulic cylinder. The leaf spring engages another stop on the mounting bracket to prevent further rotation of the spring when the switch is closed while permitting a relative tightening between the seat belt straps after the switch is closed.

Thus, the starter relay and solenoid operated valve may only be operated when the seat belt straps are buckled together in front of the seated operator. If the straps are unbuckled, the switch will be open thereby preventing operation of the relay or valve.

The seat belt straps are also inserted through open ended box-shaped flexible shields on opposed sides of the operator's chair. The flexible shields extend generally to the level of the operator's seat with leaf springs extending from the ends of the shields to positions beneath and slightly inwardly of the arms of the chair. The seat belt straps may also be provided with metal projections which are attached adjacent to their buckled ends. Thus, if the operator attempts to leave the seat belt straps unbuckled or to buckle the straps behind him, the leaf springs or metal projections will cause sufficient discomfort to prevent this non-use or misuse of the seat belt assembly.

Other advantages and meritorious features of the seat belt assembly of the present invention will be more fully understood from the following description of the invention, the appended claims, and the drawings, a brief description of which follows.

BRIEF DESCRIPTION OF DRAWINGS

FIG. 4 is a schematic side elevational view illustrating the position of the rotatable support member when the seat belt straps are unbuckled.

FIG. 5 is a schematic side elevational view illustrating the position of the rotatable support member when the seat belt straps are initially buckled.

FIG. 6 is a schematic side elevational view illustrating the position of the rotatable support member when the seat belt straps are tightened.

FIG. 7 is a side elevational view, partly in cross-section, illustrating the connection between the rotatable support member and mounting bracket.

DETAILED DESCRIPTION OF THE INVENTION

Figure 1:
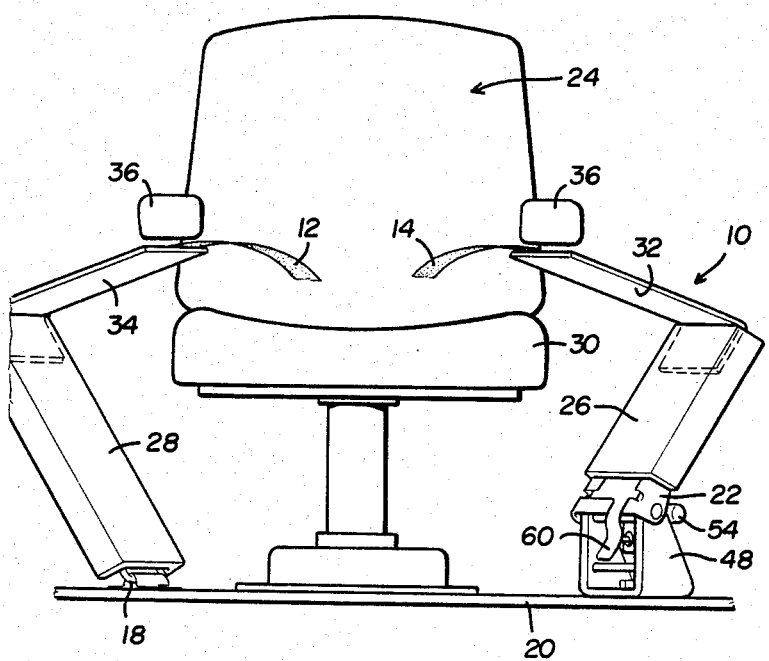
FIG. 1 is a front view of an operator's chair provided with the seat belt assembly of the present invention.

The seat belt assembly 10 of the present invention, which is illustrated in FIGS. 1–7, includes a pair of opposed straps 12 and 14 with one end of strap 12 having a buckle 16 for receiving and securing one end of strap 14, as is conventional. The opposite end of strap 12 is fixedly secured to bracket 18 which is mounted to operator's compartment floor 20. The opposite end of strap 14 is connected to support member 22.

One of the features of the seat belt assembly 10 is that it requires an individual to buckle straps 12 and 14 together in front of him when he is seated in chair 24 thereby making it impractical to subvert the purpose of using seat belt assembly 10. This is accomplished in several ways.

Referring to FIG. 1, straps 12 and 14 may be inserted through open ended box-shaped flexible shields 26 and 28 on opposed sides of chair 24. Flexible shields 26 and 28 extend generally to the level of seat 30 of chair 24 with one end of shield 26 being fitted onto support member 22 and with one end of shield 28 being fitted onto floor bracket 18. Leaf springs 32 and 34 extend from the opposite ends of shields 26 and 28 to positions beneath and slightly inwardly of chair arms 36. Thus, if the operator attempts to leave straps 12 and 14 unbuckled or to buckle straps 12 and 14 behind him, the leaf springs 32 and 34 will cause sufficient discomfort to prevent this non-use or misuse of the seat belt assembly 10.

Figure 2:
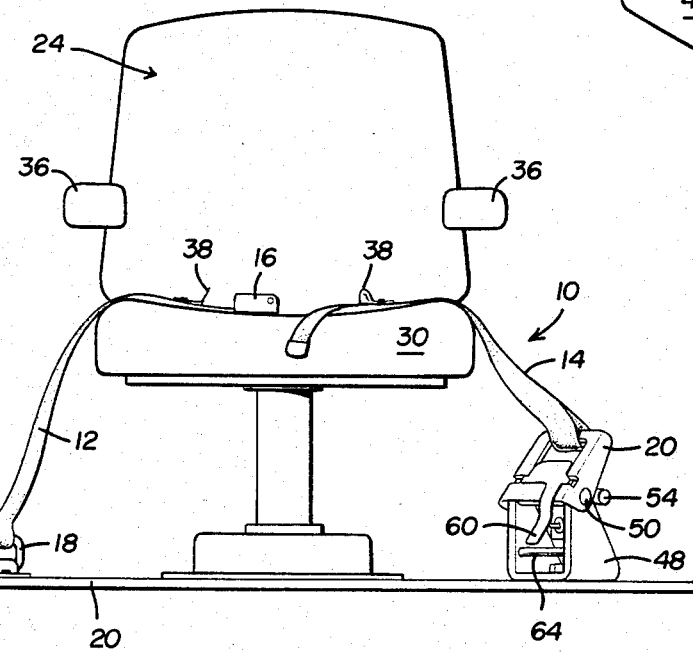
FIG. 2 is a view similar to FIG. 1 with the flexible shield and leaf spring discomfort-causing devices removed.

Straps 12 and 14 may also be provided with metal projections 38, such as shown in FIG. 2, which are attached adjacent to the buckled ends of straps 12 and 14 for again causing discomfort to the operator if the straps 12 and 14 are not buckled in front of the operator in the proper and intended fashion. As will be recognized by those skilled in the art, discomfort projections 38 may be used in addition to the shield-leaf spring devices shown in FIG. 1 or alone as shown in FIG. 2.

Figure 3:
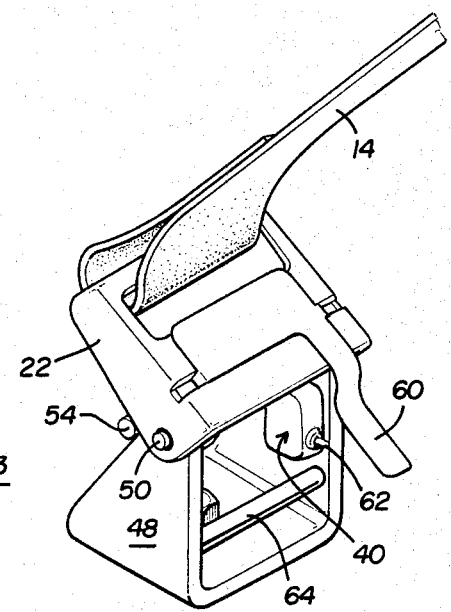
FIG. 3 is a perspective view illustrating the rotatable support member and mounting bracket for the switch.

The seat belt assembly 10 also includes a switch 40 which is electrically connected in a circuit having conventional elements including a key start 42, starter relay 44, and solenoid operated hydraulic valve 46, as schematically illustrated in FIG. 4. Switch 40 is secured to mounting bracket 48 which is connected to compartment floor 20. Support member 22 is pivotally attached by shaft 50 to mounting bracket 48 for rotation about a generally horizontal axis. A torsion spring 52 (FIG. 7) is mounted on shaft 50 for biasing support member 22 towards a position in engagement with transverse stop 54 as shown in FIGS. 3, 4 and 7. Spring 52 includes a first leg 56 engaging support member 22 and a second leg 58 engaging mounting bracket 48 for normally biasing member 22 into engagement with stop 54.

A leaf spring 60 is connected to support member 22 for actuating switch 40 when support member 22 is rotated in response to the buckling of straps 12 and 14. FIG. 4 illustrates the position of support member 22 when straps 12 and 14 are unbuckled. In this position, torsion spring 52 biases member 22 against stop 54 to prevent engagement between leaf spring 60 and switch 40. Switch 40 is open in the position shown in FIG. 4 whereby the starter relay 44 and solenoid operated valve 46 cannot be operated, and therefore, the engine (not shown) and hydraulic cylinder (not shown) connected to relay 44 and valve 46 cannot be operated. When the operator assumes a seated position and buckles the ends of straps 12 and 14 as shown in FIG. 5, support member 22 is rotated thereby bringing leaf spring 60 into engagement with plunger 62 for closing switch 40. As shown in FIGS. 5 and 6, leaf spring 60 engages stop 64 to prevent further rotation of spring 60 while permitting a relative tightening between straps 12 and 14 after switch 40 is closed.

Starter relay 44 and valve 46 may only be operated when straps 12 and 14 are buckled together in front of a seated operator thereby closing switch 40. If straps 12 and 14 are unbuckled, then switch 40 will be open as shown in FIG. 4 thereby preventing actuation of relay 44 or valve 46. Further, as described, leaf springs 32 and 34 and projections 38 are provided to prevent an operator's attempt to misuse or not use the seat belt assembly 10.

It will be apparent to those skilled in the art that the foregoing disclosure is exemplary in nature rather than limiting, the invention being limited only by the appended claims.

I claim:

1. A seat belt assembly for use in connection with an operator's chair which is mounted on a frame, said seat belt assembly comprising:

first and second opposed straps and means for securing one end of said first strap to one end of said second strap, the other end of said first strap secured to said frame and the other end of said second strap connected to a rotatable support member;

said straps inserted through open flexible shield members which are positioned on opposed sides of said operator's chair, spring members extending from said shield members to positions beneath and slightly inwardly of arms on said chair, and said straps supported by said spring members such that said spring members cause discomfort to an operator who fails to buckle said straps together in front of him; and switch means secured to a mounting bracket on said frame, said support member rotatably attached to said mounting bracket, spring means for normally biasing said support member against a stop on said mounting bracket, and a spring actuator member mounted on said support member for actuating said switch means when said support member is rotated in response to the securing of said straps together.

2. The seat belt assembly as defined in claim 1 wherein said straps include projections adjacent their secured ends for also causing discomfort to the operator if said straps are not secured together in front of the operator.

3. The seat belt assembly as defined in claim 1 whereby said switch means being electrically connected to means for starting an engine and to valve actuating means whereby said starting means and valve actuating means are inoperable until said support member and spring actuator member are rotated for actuating said switch means in response to the securing of said straps together.

4. The seat belt assembly as defined in claim 3 wherein said spring actuator member engaging a stop on said mounting bracket when the switch means is actuated thereby preventing further rotation of the spring actuator member.

5. The seat belt assembly for use in connection with an operator's chair which is mounted on a frame, said seat belt assembly comprising:

first and second opposed straps and means for securing one end of said first strap to one end of said second strap, and the opposite ends of said straps secured to said frame;

said straps inserted through open flexible shield members which are positioned on opposed sides of said operator's chair, spring members extending from said shield members to positions beneath and slightly inwardly of arms on said chair, and said straps supported by said spring members such that said spring members cause discomfort to an operator who fails to buckle said straps together in front of him.

6. The seat belt assembly as defined in claim 5 wherein said straps include projections adjacent their secured ends for also causing discomfort to the operator if said straps are not secured together in front of the operator.

* * * * *